(12) United States Patent
Nakagawa et al.

(10) Patent No.: US 10,253,218 B2
(45) Date of Patent: Apr. 9, 2019

(54) ADHESIVE TAPE

(71) Applicant: Maxell Holdings, Ltd., Otokuni-gun, Kyoto (JP)

(72) Inventors: Tadahiko Nakagawa, Ibaraki (JP); Masahiro Saigo, Ibaraki (JP); Akiyoshi Masuda, Ibaraki (JP)

(73) Assignee: MAXELL HOLDINGS, LTD., Kyoto (JP)

( * ) Notice: Subject to any disclaimer, the term of this patent is extended or adjusted under 35 U.S.C. 154(b) by 0 days.

(21) Appl. No.: 15/141,038

(22) Filed: Apr. 28, 2016

(65) Prior Publication Data

US 2016/0319163 A1 Nov. 3, 2016

(30) Foreign Application Priority Data

Apr. 30, 2015 (JP) .................. 2015-093474

(51) Int. Cl.
*C09J 7/50* (2018.01)
*C09J 7/24* (2018.01)
*C09J 7/25* (2018.01)
*C09J 123/22* (2006.01)
*C08K 5/01* (2006.01)
*C08K 5/18* (2006.01)

(52) U.S. Cl.
CPC ........ *C09J 7/50* (2018.01); *C08K 5/01* (2013.01); *C08K 5/18* (2013.01); *C09J 123/22* (2013.01); *C09J 7/241* (2018.01); *C09J 7/255* (2018.01); *C09J 2205/102* (2013.01); *C09J 2409/00* (2013.01); *C09J 2409/003* (2013.01); *C09J 2423/006* (2013.01)

(58) Field of Classification Search
None
See application file for complete search history.

(56) References Cited

U.S. PATENT DOCUMENTS

| | | | | |
|---|---|---|---|---|
| 7,759,442 B2 * | 7/2010 | Okada | .................. | C08F 220/18 428/354 |
| 2003/0216519 A1 * | 11/2003 | Heilmann | ............ | C09D 201/08 525/191 |
| 2009/0130157 A1 * | 5/2009 | Ylitalo | .................. | A01N 25/34 424/405 |

FOREIGN PATENT DOCUMENTS

| | | |
|---|---|---|
| JP | 2004-10847 A | 1/2004 |
| JP | 2011-74191 A | 4/2011 |

OTHER PUBLICATIONS

Machine translation of JP 2011074191 A (2011).*

* cited by examiner

*Primary Examiner* — Frank D Ducheneaux
(74) *Attorney, Agent, or Firm* — Birch, Stewart, Kolasch & Birch, LLP

(57) ABSTRACT

An adhesive tape includes: a sheet-like base; an undercoat layer that is laminated on the base and contains an acid modified compound; and an adhesive agent layer that is laminated on the undercoat layer and contains butyl rubber, an alicyclic saturated hydrocarbon resin and a multifunctional epoxy-based compound.

5 Claims, 1 Drawing Sheet

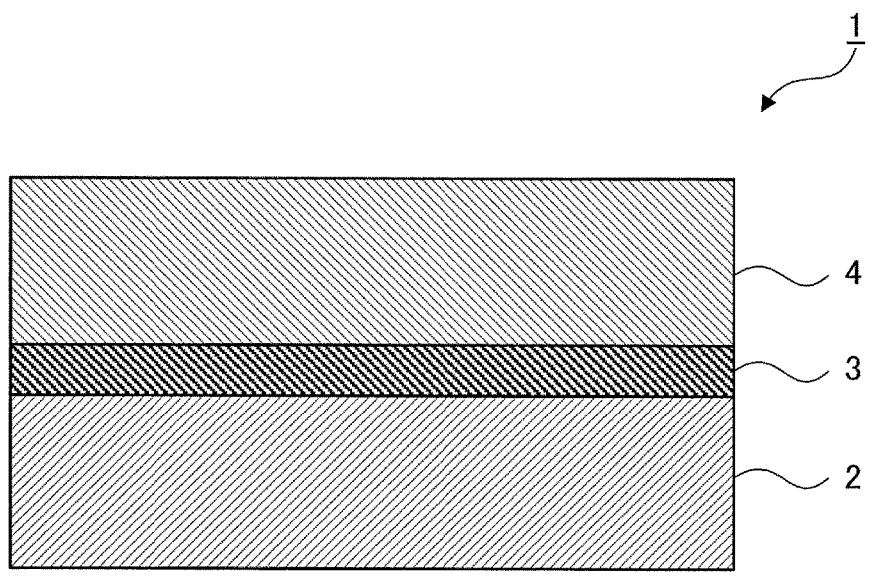

ADHESIVE TAPE

CROSS REFERENCE TO RELATED APPLICATIONS

This application is based on and claims priority under 35 USC § 119 from Japanese Patent Application No. 2015-093474 filed Apr. 30, 2015.

BACKGROUND

Technical Field

The present invention relates to an adhesive tape.

Related Art

Conventionally, to close wells formed in a microplate used in analysis of a sample by a high performance liquid chromatography, an adhesive tape has been used.

For example, in Japanese Patent Application Laid-Open Publication No. 2004-10847, as an adhesive tape for closing wells in a microplate, the adhesive tape including a base film and an adhesive agent layer laminated on one surface of the base film is disclosed. The base film has 25 μm to 150 μm thickness and 5 N/10 mm to 100 N/10 mm 25% modulus. The adhesive agent layer 2 is composed of a silicone-based adhesive agent having 15 μm to 100 μm thickness.

In the adhesive tape for closing the wells in the microplate, it is preferable that the solubility of an adhesive agent layer in a solvent contained in a sample is low to suppress contamination of a sample injected into the wells.

However, the silicone-based adhesive agent, as disclosed in Japanese Patent Application Laid-Open Publication No. 2004-10847, has relatively high solvent resistance, but there was a possibility of being incapable of sufficiently satisfying the solvent resistance in the case where an analysis with a higher degree of accuracy is required.

With regard to the solvent resistance of the adhesive agent, the present inventors have revealed that, in Japanese Patent Application Laid-Open Publication No. 2011-74191, an adhesive composition blending 5-30 parts by weight of an alicyclic saturated hydrocarbon resin of 85° C.-140° C. of a softening temperature to 100 parts by weight of butyl rubber has excellent solvent resistance to a highly polarized organic solvent, such as acetonitrile, dimethyl sulfoxide and methanol.

SUMMARY

However, even though the adhesive tape was prepared by using the adhesive composition blending 5-30 parts by weight of the alicyclic saturated hydrocarbon resin of 85° C.-140° C. of a softening temperature to 100 parts by weight of butyl rubber, there was a possibility that adhesion of the adhesive agent to the microplate (adhesive deposit) when the adhesive tape was removed from the microplate was in an unsatisfactory state.

An object of the present invention is to provide an adhesive tape suitable for use in closing wells formed in a microplate.

Based on this object, as a result of earnest study by the present inventors, it was found that the adhesive deposit when the adhesive tape was removed was less likely to occur by improving adhesiveness between the sheet-like base and the adhesive agent layer, and further, the adhesive deposit when the adhesive tape was removed was far less likely to occur by improving cohesion force of the adhesive agent layer, to thereby reach the present invention. In other words, it was found that, by providing an undercoat layer containing an acid modified compound between the sheet-like base and the adhesive agent layer and by adding a multifunctional epoxy-based compound to an adhesive agent composition containing butyl rubber and an alicyclic saturated hydrocarbon resin that is excellent in solvent resistance to a highly polarized organic solvent, the adhesiveness between the sheet-like base and the adhesive agent layer was improved, and thereby adhesive deposit was less likely to occur.

An adhesive tape to which the present invention is applied includes: a sheet-like base; an undercoat layer that is laminated on the base and contains an acid modified compound; and an adhesive agent layer that is laminated on the undercoat layer and contains butyl rubber, an alicyclic saturated hydrocarbon resin and a multifunctional epoxy-based compound.

Here, the base is composed of a polyolefin-based polymer.

Moreover, the adhesive agent layer further contains polyisobutylene.

Further, the undercoat layer contains an acid modified polyolefin compound as the acid modified compound.

Still further, the adhesive tape has linear light transmittance of 85% or more to any light in a range of wavelength from 340 nm or more to 800 nm or less.

Moreover, the adhesive agent layer has solubility of 3% or less in each of acetonitrile, dimethyl sulfoxide and methanol.

Further, the adhesive agent layer has an adhesive force of 3N/10 mm or more with respect to each of polypropylene, polystyrene, polycarbonate, a cycloolefin polymer and a cycloolefin copolymer under a temperature from 0° C. to 40° C.

According to the present invention, it is possible to provide the adhesive tape suitable for use in closing the wells formed in the microplate.

BRIEF DESCRIPTION OF THE DRAWINGS

An exemplary embodiment of the present invention will be described in detail based on the following figures, wherein:

FIG. 1 is a diagram showing a specific example of a configuration of an adhesive tape to which the exemplary embodiment is applied.

DETAILED DESCRIPTION

Hereinafter, an exemplary embodiment according to the present invention will be described.

[Configuration of Adhesive Tape]

FIG. 1 is a diagram showing a specific example of a configuration of an adhesive tape 1 to which the exemplary embodiment is applied. As shown in FIG. 1, the adhesive tape 1 of the exemplary embodiment includes a sheet-like base 2, an undercoat layer 3 laminated on the base 2 and an adhesive agent layer 4 laminated on the undercoat layer 3.

Note that, though illustration is omitted, the adhesive tape 1 may include a release liner on a surface of the adhesive agent layer 4 (a surface opposite to the surface facing the undercoat layer 3).

The adhesive tape 1 of the exemplary embodiment is used for closing openings of plural wells provided in a microplate.

Here, the microplate refers to a box-like molded article which is made of a resin, such as polypropylene or polystyrene, and in which plural wells are formed for injecting a sample. A sample containing a solvent is injected into the wells of the microplate, and openings of the plural wells are sealed at once by the adhesive tape 1. Then, the microplate is stored with the adhesive tape 1 being attached thereto, or is loaded to an analyzing device, such as a microplate reader, with the adhesive tape 1 being attached thereto for measuring optical properties, such as absorption of light, fluorescence or chemiluminescence of the sample injected into the wells.

For example, a microplate with 96 or more wells each having a capacity of several milliliters is mainly used for storing a sample in automatic analysis by a high performance liquid chromatography. Specifically, for example, a sample dissolved in a highly polarized organic solvent, such as acetonitrile, dimethyl sulfoxide and methanol, is injected into the wells. Then, while analysis and inspection of the sample are conducted, the openings of the wells are closed by the adhesive tape 1 for preventing the sample in the wells from being contaminated by external materials or the like.

When the analysis and inspection of the sample in the wells are conducted, a hole is made in the adhesive tape 1 on the well by, for example, a syringe needle, and thereby the sample is sucked from the inside of the well.

Consequently, for suppressing deterioration in precision of analysis of the sample, it is required that, as characteristics of the adhesive tape 1, the adhesive agent layer 4 of the adhesive tape 1 is less soluble in the above-described solvents. In other words, after the adhesive tape 1 is attached to the microplate, in the case where the solvent and the adhesive agent layer 4 are in contact with each other due to conveyance or the like of the microplate, or in the case where the adhesive agent is attached to the syringe needle penetrated through the adhesive agent layer 4 in conducting the analysis, the analysis of the sample cannot be precisely conducted in some cases if the adhesive agent component is dissolved in the solvent contained in the sample.

Further, if the adhesive agent layer 4 swells or is dissolved by the solvent or solvent vapors, there is a possibility of deterioration in adhesive force of the adhesive tape 1. As a result, sealing force against the wells of the microplate is deteriorated, and thereby, in some cases, the solvent in the wells is volatilized or an amount of adhesion of the adhesive agent onto the microplate (adhesive deposit) is increased when the adhesive tape 1 is released from the microplate.

Moreover, there is a case in which the microplate is loaded to the analyzing device without releasing the adhesive tape 1 from the microplate, to thereby optically analyze the sample in the wells with the adhesive tape 1 in between. Specifically, for measuring the optical properties, such as absorption of light, fluorescence or chemiluminescence, of the sample in the wells of the microplate by an analyzing device, such as a microplate reader, there are some cases in which the microplate is loaded to the device with the adhesive tape 1 being attached. In this case, for letting light enter into the sample with the adhesive tape 1 in between, it is preferable that the adhesive tape 1 has high transmittance to any light used for optical analysis within the range of wavelength from 340 nm or more and 800 nm or less.

Still further, when the sample in the microplate is returned to an original container or is discarded after the analysis is completed, it is necessary to remove the adhesive tape 1 from the microplate. In this case, as the characteristics of the adhesive tape 1, it is required that, after the adhesive tape 1 is removed, there is less adhesion (adhesive deposit) of the adhesive agent on the microplate.

For the requirements, in the exemplary embodiment, the adhesive tape 1, which has low solubility in a highly polarized organic solvent, such as acetonitrile, dimethyl sulfoxide or methanol, used for analysis or inspection by the high performance liquid chromatography, excellent adhesive characteristics, suppressed adhesive deposit after removing the adhesive tape 1 and excellent optical characteristics, is realized by employing the following configuration.

To specifically describe, the present inventors found that the adhesive deposit when the adhesive tape 1 was removed was less likely to occur if the adhesiveness between the sheet-like base 2 and the adhesive agent layer 4 was improved, and further, the adhesive deposit when the adhesive tape 1 was removed was far less likely to occur if the cohesion force of the adhesive agent layer 4 was improved. In other words, it was found that the adhesiveness between the sheet-like base 2 and the adhesive agent layer 4 was improved and thereby adhesive deposit was less likely to occur by providing the undercoat layer 3 containing an acid modified compound between the sheet-like base 2 and the adhesive agent layer 4 and by adding a multifunctional epoxy-based compound to an adhesive agent composition containing butyl rubber and an alicyclic saturated hydrocarbon resin excellent in solvent resistance to a highly polarized organic solvent. Further, it was found that, by causing the adhesive agent composition to contain polyisobutylene that is excellent in solvent resistance to the highly polarized organic solvent, the cohesion force of the adhesive agent layer 4 was further improved, to thereby make the adhesive deposit far less likely to occur.

Further, it was found that, in the adhesive tape 1, by using a resin film of high transparency of an optical-use grade with less additives, such as an antiblocking agent or an ultraviolet absorbing agent, or substantially with no additives as the base 2 and by employing the undercoat layer 3 and the adhesive agent layer 4 as described above on the base 2, it became possible to obtain linear light transmittance of 85% or more for any light within the range of wavelength from 340 nm or more to 800 nm or less, and thereby the adhesive tape 1 suitable to the optical analysis could be obtained.

Subsequently, a configuration of each layer of the adhesive tape 1 in the exemplary embodiment will be described in detail.

(Base)

The material of the base 2 used for the adhesive tape 1 of the exemplary embodiment is not particularly limited, and, for example, a metallic base or a plastic base may be used. Specifically, as the base 2, for example, a metallic foil of aluminum, stainless steel or the like, and a resin film of a polyolefin-based resin, a polyester-based resin, a cycloolefin-based resin or the like can be used. Of these, it is preferable to use a film of the polyolefin-based resin, the polyester-based resin or the cycloolefin-based resin as the base 2. Further, from a viewpoint of costs or ease of post-processing, it is more preferable to use a film of the polyolefin-based resin as the base.

In the adhesive tape 1 of the exemplary embodiment, by using a film of the polyolefin-based resin, the polyester-based resin or the cycloolefin-based resin as the base 2, deterioration in optical characteristics of the adhesive tape 1 is suppressed. Further, by using the polyolefin-based resin, it becomes possible to reduce the costs, and to make the post-processing, such as embossing, easy.

The polyolefin-based resin used for the base 2 is not particularly limited; examples of the polyolefin-based resin include polyethylene, polypropylene, an ethylene-propylene copolymer, an ethylene-methyl acrylate copolymer, an ethylene-vinyl acetate copolymer, an ethylene-vinyl chloride copolymer or the like.

Moreover, the polyester-based resin used for the base 2 is not particularly limited; examples of the polyester-based resin include polyethylene terephthalate, polyethylene naphthalate, polybutylene terephthalate or the like.

Still further, the cycloolefin-based resin used for the base 2 is not particularly limited; examples of the cycloolefin-based resin include a cycloolefin polymer, a cycloolefin copolymer or the like.

In the case where a film of the polyolefin-based resin, the polyester-based resin or the cycloolefin-based resin is used as the base 2, the thickness of the base 2 is preferably within the range from 20 µm or more to 150 µm or less, and is more preferably within the range from 30 µm or more to 120 µm or less. However, as long as the strength capable of suppressing occurrence of excessive elongation or breakage of the adhesive tape 1 can be achieved when the adhesive tape 1 is attached to the microplate, the thickness of the base 2 is not particularly limited.

Moreover, in the case where the adhesive tape 1 is used for the purpose of performing optical measurement, it is preferable that the base 2 has linear light transmittance of 85% or more for any light of wavelength from 340 nm or more to 800 nm or less. Moreover, for suppressing deterioration of linear light transmittance of the adhesive tape 1, it is preferable to use a film of the polyolefin-based resin, the polyester-based resin or the cycloolefin-based resin with high transparency and of the optical-use grade with less additives, such as an antiblocking agent or an ultraviolet absorbing agent, or substantially with no additives as the base 2. Further, from a viewpoint of costs or ease of post-processing, it is more preferable to use a film of the polyolefin-based resin with high transparency and of the optical-use grade as the base 2.

(Undercoat Layer)

The undercoat layer 3 is used for improving adhesiveness between the base 2 and the adhesive agent layer 4.

The undercoat layer 3 of the exemplary embodiment contains an acid modified compound. Examples of the acid modified compound used for the undercoat layer 3 include acid modified polyolefin, acid modified polyurethane or the like.

In the exemplary embodiment, of these, it is preferable to use acid modified polyolefin that is optically transparent and has solvent resistance to the highly polarized organic solvent, such as acetonitrile, dimethyl sulfoxide, methanol or the like, as the acid modified compound. Due to the undercoat layer 3 that contains the above-described acid modified polyolefin, it is possible to improve the adhesiveness between the base 2 and the adhesive agent layer 4 without reducing linear light transmittance of the adhesive tape 1 for any light of wavelength from 340 nm or more to 800 nm or less. Then, even in the case where the wells containing a highly polarized organic solvent are stored for a long time in a state being closed by the adhesive tape 1, it becomes possible to conduct optical measurement in a state of causing the adhesive tape 1 to attach to the microplate without contaminating the sample.

The above-described acid modified polyolefin used for the undercoat layer 3 is a compound obtained by applying graft polymerization of unsaturated carboxylic acid and/or acid anhydride thereof to polyolefin. Specifically, for example, unsaturated carboxylic acid and/or acid anhydride thereof, which is coupled to polyolefin to form a main chain via any carbon adjacent to a carbonyl group contained by itself, to thereby form a side chain, is given.

As the above-described acid modified polyolefin, commercialized products can be used; examples of the commercialized products include "UNISTOLE P-902", "UNISTOLE P-802" and "UNISTOLE P-501" (product names) manufactured by Mitsui Chemicals, Inc., "Colnova MPO-A502" and "Colnova MPO-A201" (product names) manufactured by Nihon Cima Co., Ltd., "HARDLEN" (product name) manufactured by TOYOBO CO., LTD., "AUROREN" (product name) manufactured by NIPPON PAPER Chemicals CO., LTD., "SURFLEN" (product name) manufactured by Mitsubishi Chemical Holdings Corporation, "SUMIFITT" (product name) manufactured by Sumika Chemtex Co., Ltd., and "ZAIKTHENE" (product name) manufactured by SUMITOMO SEIKA CHEMICALS CO., LTD.

Moreover, the above-described acid modified polyolefin used for the undercoat layer 3 is able to be prepared by well-known and common methods. For example, the acid modified polyolefin is able to be prepared by a method of melting and mixing polyolefin before being modified with acid and unsaturated carboxylic acid or acid anhydride thereof under the presence of a radical generating agent, such as an organic peroxide, a peroxide or the like.

As the polyolefin before being modified with acid, which is used for preparation of acid modified polyolefin, for example, an α-olefin monopolymer of 2-10 carbons, such as ethylene, propylene, 1-butene, 1-hexene, 3-methyl-1-butene, 4-methyl-1-pentene, 1-heptene, 1-octene, 1-decene or the like, a random or block polymer of two or more of the above-described α-olefin monopolymers, a random, block or graft polymer of the above-described α-olefin monopolymer and other monomers, or mixed material of these polymers can be given.

Note that the undercoat layer 3 may further contain, in addition to the acid modified compound, a cross-linking agent, such as a multifunctional epoxy-based compound, or other adding agents.

Here, in general, a polyolefin film has a high shrinkage rate by heating. Therefore, in the adhesive tape using the polyolefin film as a base, if an adhesive agent is directly applied onto the base and dried by heating, problems, such as width shrinkage or heat wrinkling, may occur in some cases.

To suppress occurrence of such problems, when the adhesive tape 1 of the exemplary embodiment is prepared, for example, a transfer coating system, in which an adhesive agent constituting the adhesive agent layer 4 is applied onto the release liner made of, for example, a PET film or the like having a heat resisting property, and then bonded to the base 2 made of a polyolefin film, is used in some cases. In this case, after the undercoat layer 3 is applied to the base 2 made of the polyolefin film, it is necessary to once rewind the base 2 on which the undercoat layer 3 is formed.

For example, in the case where the undercoat layer 3 is formed on the base 2 made of the polyolefin film and having a smooth surface, slip properties between the base 2 and the undercoat layer 3 when the base 2 is rewind are likely to be deteriorated. In this case, since inclusion of air in rewinding the base 2 is unable to be eased, wrinkling occurs in the base 2 in some cases.

Therefore, it is preferable to add an additive agent to the undercoat layer 3 to suppress deterioration of the slip properties. As the additive agent added to the undercoat layer 3, it is preferable to use fine particles made of a material having high optical transparency in a visible-ultraviolet region, such as, for example, polymethylmethacrylate, olefin or silica. It is preferable that the particle diameter of the additive agent added to the undercoat layer 3 falls within the range from 0.1 µm or more to 1.3 µm or less. Moreover, an adding amount of the additive agent in the undercoat layer 3 is preferably in the range from 1 part by weight or more to 12 parts by weight or less when the amount of the acid modified compound (acid modified polyolefin) is assumed to be 100 parts by weight.

Moreover, in the case where the undercoat layer 3 is formed by coating the base 2 with the above-described acid modified polyolefin, the coating amount of the acid modified polyolefin is preferably in the range from 0.2 $g/m^2$ or more to 0.6 $g/m^2$ or less. By setting the coating amount of the acid modified polyolefin in such a range, in the adhesive tape 1, the adhesiveness between the base 2 and the adhesive agent layer 4 via the undercoat layer 3 is improved, and thereby occurrence of adhesive deposit on the microplate when the adhesive tape 1 is removed from the microplate is suppressed.

(Adhesive Agent Layer)

The adhesive agent layer 4 of the exemplary embodiment contains the butyl rubber, the alicyclic saturated hydrocarbon resin and the multifunctional epoxy-based compound as the adhesive agent. Moreover, it is preferable that the adhesive agent layer 4 contains polyisobutylene as the adhesive agent.

In the adhesive agent layer 4 of the exemplary embodiment, since the butyl rubber and the alicyclic saturated hydrocarbon resin are contained as the adhesive agent, the adhesive agent layer 4 is prevented from being dissolved in the highly polarized organic solvent, such as acetonitrile, dimethyl sulfoxide and methanol. Specifically, it is possible to set the solubility in acetonitrile, dimethyl sulfoxide and methanol to 3% or less. As a result, dissolving of components in the adhesive agent constituting the adhesive agent layer 4 in the sample injected to the wells of the microplate is suppressed, and accordingly, deterioration in preciseness of analysis and inspection of the sample can be suppressed. Moreover, since the butyl rubber absorbs less light in the visible-ultraviolet region with the wavelength from 340 nm or more to 800 nm or less, the butyl rubber is a material suitable to the case in which the adhesive tape 1 is used for optical analysis.

In the multifunctional epoxy-based compound contained in the adhesive agent constituting the adhesive agent layer 4, many of glycidyl groups having low compatibility to the butyl rubber, the alicyclic saturated hydrocarbon resin and polyisobutylene are unevenly distributed on the surface of the adhesive agent layer 4. In other words, many of glycidyl groups in the multifunctional epoxy-based compound are unevenly distributed in a portion of the adhesive agent layer 4 that is close to the undercoat layer 3. Then, since the glycidyl groups react with carboxyl groups or the like in the acid modified compound contained in the undercoat layer 3, the adhesiveness between the adhesive agent layer 4 and the undercoat layer 3 is improved.

As a result, the adhesive deposit when the adhesive tape 1 is removed is suppressed.

Moreover, due to inclusion of polyisobutylene in the adhesive agent layer 4, entanglement among each material constituting the adhesive agent layer 4 becomes large, and thereby the cohesion force of the adhesive agent layer 4 is more improved. Further, polyisobutylene has a suppressing effect for solubility in the highly polarized organic solvent, such as acetonitrile, dimethyl sulfoxide and methanol, which is the same level as the above-described butyl rubber and alicyclic saturated hydrocarbon resin. This makes it possible to further improve the cohesion force of the adhesive agent layer 4 without reducing solvent resistance of the adhesive agent layer 4 to the highly polarized organic solvent. As a result, it is possible to further suppress the adhesive deposit when the adhesive tape 1 is removed. Moreover, since polyisobutylene absorbs less light in the visible-ultraviolet region with the wavelength from 340 nm or more to 800 nm or less, polyisobutylene is a material suitable to the case in which the adhesive tape 1 is used for optical analysis.

Note that the adhesive agent constituting the adhesive agent layer 4 may further contain an additive agent, such as a softener, an antioxidant, a cross-linking agent, a heat stabilizer or a pigment.

As the butyl rubber used for the adhesive agent layer 4 of the exemplary embodiment, other than regular rubber, halogenated butyl rubber to which a functional group is imparted can be used. By using the butyl rubber for the adhesive agent layer 4, regardless of the grade due to the difference in Mooney viscosity of the regular butyl rubber or the special grade of the halogenated butyl rubber, it becomes possible to set the solubility of the adhesive agent layer 4 in the acetonitrile, dimethyl sulfoxide and methanol to 3% or less.

As the polyisobutylene rubber, it is preferable to use the polyisobutylene rubber of high-molecular weight. By using the polyisobutylene rubber of high-molecular weight, entanglement among each material constituting the adhesive agent layer 4 becomes large, and thereby the cohesion force of the adhesive agent layer 4 is more improved, and accordingly, the adhesive deposit when the adhesive tape 1 is removed from the microplate is further reduced.

It is preferable that the number average molecular weight of the polyisobutylene rubber is 150,000 or more.

Moreover, in the rubber component, such as the butyl rubber or the polyisobutylene rubber, in general, an age resistor, such as the ultraviolet absorbing agent or the antioxidant, is contained. In the adhesive agent layer 4 of the exemplary embodiment, it is preferable to use the rubber component containing the age resistor that absorbs less light in the visible-ultraviolet region of the wavelength from 340 nm or more to 800 nm or less.

As the alicyclic saturated hydrocarbon resin, it is preferable to use the alicyclic saturated hydrocarbon resin that is hydrogenated. Moreover, it is preferable that the softening temperature of the alicyclic saturated hydrocarbon resin is in the range from 85° C. or more to 140° C. or less. By setting the softening temperature of the alicyclic saturated hydrocarbon resin within this range, it becomes possible to set the solubility of the adhesive agent layer 4 in acetonitrile, dimethyl sulfoxide and methanol to 3% or less. Moreover, since the alicyclic saturated hydrocarbon resin absorbs less light in the visible-ultraviolet region with the wavelength from 340 nm or more to 800 nm or less, the alicyclic saturated hydrocarbon resin is a material suitable to the case in which the adhesive tape 1 is used for optical analysis.

Moreover, as the multifunctional epoxy-based compound, it is preferable to use an alicyclic or linear multifunctional epoxy-based compound with the epoxy equivalent in the range from 70 or more to 150 or less. Moreover, as the multifunctional epoxy-based compound, it is preferable to use a compound having two or more epoxy groups within one molecule, and it is more preferable to use a compound having four or more epoxy groups within one molecule.

Examples of the multifunctional epoxy-based compound used for the adhesive agent layer 4 of the exemplary embodiment include an epoxy compound containing tertiary amino groups, such as tetraglycidyl meta-xylene diamine, triglycidyl p-aminophenol, or diglycidylaniline, in a molecule, and a polyepoxy compound, such as neopentyl glycol diglycidyl ether, 1,6-hexanediol diglycidyl ether, or a methyl methacrylate-glycidyl methacrylate copolymer.

It is preferable that, if an amount of the rubber component is assumed to be 100 parts by weight, the adhesive agent constituting the adhesive agent layer 4 of the exemplary embodiment contains the alicyclic saturated hydrocarbon resin and the softener together in the range from 10 parts by weight or more to 50 parts by weight or less, and the multifunctional epoxy-based compound in the range from 0.1 parts by weight or more to 1.0 parts by weight or less. Here, the rubber component of the adhesive agent contains the above-described butyl rubber and polyisobutylene rubber. Moreover, in the adhesive agent layer 4 of the exemplary embodiment, it is preferable that 40% to 80% of the rubber component is the butyl rubber.

Note that, in the case where the content of the multifunctional epoxy-based compound is less than 0.1 parts by weight in the adhesive agent constituting the adhesive agent layer 4, interaction with the acid modified compound contained in the undercoat layer 3 is declined, and accordingly, the adhesive force between the adhesive agent layer 4 and the undercoat layer 3 is reduced. In this case, the adhesive deposit when the adhesive tape 1 is removed is likely to occur. Moreover, in the case where the content of the multifunctional epoxy-based compound is more than 1.0 part by weight in the adhesive agent constituting the adhesive agent layer 4, an unreacted multifunctional epoxy-based compound bleeds out of the surface of the adhesive agent layer 4 in some cases. In this case, there is a possibility that adhesive force of the adhesive agent layer 4 is reduced, or the microplate or the sample in the microplate is contaminated by the multifunctional epoxy-based compound that has been bled out. Moreover, in the case where the content of the multifunctional epoxy-based compound is more than 1.0 part by weight in the adhesive agent constituting the adhesive agent layer 4, there is a possibility that light transmittance in the ultraviolet region is significantly reduced depending on the type of the multifunctional epoxy-based compound.

Moreover, in the adhesive tape 1 of the exemplary embodiment, the adhesive force with respect to polypropylene (PP), polystyrene (PSt), polycarbonate (PC), the cycloolefin polymer (COP) and the cycloolefin copolymer (COC) under the temperature of 0° C. to 40° C. is preferably 3N/10 mm or more, and more preferably, 5N/10 mm or more. By setting the adhesive force in such a range, adhesiveness of the adhesive tape 1 with respect to the microplate is improved, and therefore, removal of the adhesive tape 1 from the microplate is suppressed. As a result, the sample injected into the wells is prevented from leaking from the microplate, or, impurities from the outside are prevented from being mixed into the sample.

Moreover, it is preferable that the adhesive force of the adhesive agent layer 4 with respect to these resins is 10N/10 mm or less. By setting the adhesive force in such a range, for example, it becomes possible to remove the adhesive tape 1 from the microplate as needed after the analysis of the sample is completed.

EXAMPLES

Subsequently, the present invention will be described in more detail by use of the examples. Note that the present invention is not limited to the following examples.
1. Preparation of Adhesive Tape 1

Example 1

40 g of regular butyl rubber ("Exxon Butyl 268" (product name, the same applies hereinafter) manufactured by Exxon Mobil Corporation, linear light transmittance in the wavelength of 340 nm when prepared into a sheet having a thickness of 40 μm was 98.8%), 25 g of an alicyclic saturated hydrocarbon resin ("ARKON" (registered trademark in Japan, the same applies hereinafter) P125, manufactured by Arakawa Chemical Industries, Ltd., the softening temperature was 125° C.), 25 g of polyisobutylene rubber ("Oppanol" (registered trademark in Japan, the same applies hereinafter) B100, manufactured by BASF SE), 10 g of polybutene ("POLYBUTENE 30N" (product name, the same applies hereinafter), manufactured by NOF CORPORATION), and 5 g of a 5% toluene diluted solution of tetraglycidyl meta-xylene diamine (manufactured by MITSUBISHI GAS CHEMICAL COMPANY, INC., epoxy equivalent was 90) were dissolved in 400 g of toluene by a mixer, to thereby prepare an adhesive agent A.

Moreover, a corona treatment was applied to a base 2 made of an optical-use grade polyolefin film having a thickness of 40 μm (linear light transmittance in the wavelength of 340 nm was 90.5%), and an undercoat solution, which was prepared by mixing 0.88 g of an antiblocking agent ("MX-80H3wT" (product name, the same applies hereinafter), manufactured by Soken Chemical & Engineering Co., Ltd.), 0.75 g of a 5% toluene diluted solution of tetraglycidyl meta-xylene diamine (manufactured by MITSUBISHI GAS CHEMICAL COMPANY, INC., epoxy equivalent was 90), 100 g of an acid modified polyolefin compound ("UNISTOLE P-902" (product name, the same applies hereinafter), manufactured by Mitsui Chemicals, Inc.), 224.5 g of toluene and 247 g of methyl ethyl ketone, was applied with the solids contents attaching amount of 0.4 g/m$^2$ to form an undercoat layer 3, and accordingly, a first lamination body, in which the base 2 and the undercoat layer 3 were laminated, was obtained.

Subsequently, the adhesive agent A prepared in the above was applied onto a polyester film subjected to a release treatment so that the thickness thereof after being dried was 40 μm, dried by heating for three minutes at 105° C., and thereby a second lamination body, in which the adhesive agent layer 4 was laminated on the polyester film, was obtained.

Then, by bonding the first lamination body and the second lamination body so that the undercoat layer 3 and the adhesive agent layer 4 face each other, an adhesive tape 1, in which the base 2, the undercoat layer 3 and the adhesive agent layer 4 were laminated in the order, was obtained.

Example 2

40 g of the regular butyl rubber ("Exxon Butyl 268"), 25 g of the alicyclic saturated hydrocarbon resin ("ARKON" P125, manufactured by Arakawa Chemical Industries, Ltd., the softening temperature was 125° C.), 25 g of the polyisobutylene rubber ("Oppanol" B100, manufactured by BASF SE), 10 g of polybutene ("POLYBUTENE 30N" manufactured by NOF CORPORATION), and 2 g of the 5% toluene diluted solution of tetraglycidyl meta-xylene diamine (manufactured by MITSUBISHI GAS CHEMICAL COMPANY, INC., epoxy equivalent was 90) were dissolved in 400 g of toluene by the mixer, to thereby prepare an adhesive agent B.

Subsequently, in a manner similar to the example 1 except that the adhesive agent B was used in place of the adhesive agent A, the adhesive tape 1 was obtained.

Example 3

40 g of the regular butyl rubber ("Exxon Butyl 268"), 25 g of the alicyclic saturated hydrocarbon resin ("ARKON"

P125, manufactured by Arakawa Chemical Industries, Ltd., the softening temperature was 125° C.), 25 g of the polyisobutylene rubber ("Oppanol" B100, manufactured by BASF SE), 10 g of polybutene ("POLYBUTENE 30N" manufactured by NOF CORPORATION), and 20 g of the 5% toluene diluted solution of tetraglycidyl meta-xylene diamine (manufactured by MITSUBISHI GAS CHEMICAL COMPANY, INC., epoxy equivalent was 90) were dissolved in 400 g of toluene by the mixer, to thereby prepare an adhesive agent C.

Subsequently, in a manner similar to the example 1 except that the adhesive agent C was used in place of the adhesive agent A, the adhesive tape 1 was obtained.

Example 4

40 g of the regular butyl rubber ("Exxon Butyl 268"), 25 g of the alicyclic saturated hydrocarbon resin ("ARKON" P125, manufactured by Arakawa Chemical Industries, Ltd., the softening temperature was 125° C.), 25 g of the polyisobutylene rubber ("Oppanol" B100, manufactured by BASF SE), 10 g of polybutene ("POLYBUTENE 30N" manufactured by NOF CORPORATION), and 5 g of the 5% toluene diluted solution of tetraglycidyl meta-cyclohexane diamine (manufactured by MITSUBISHI GAS CHEMICAL COMPANY, INC., epoxy equivalent was 90) were dissolved in 400 g of toluene by the mixer, to thereby prepare an adhesive agent D.

Subsequently, in a manner similar to the example 1 except that the adhesive agent D was used in place of the adhesive agent A, the adhesive tape 1 was obtained.

Example 5

40 g of the regular butyl rubber ("Exxon Butyl 268"), 25 g of the alicyclic saturated hydrocarbon resin ("ARKON" P125, manufactured by Arakawa Chemical Industries, Ltd., the softening temperature was 125° C.), 25 g of the polyisobutylene rubber ("Oppanol" B100, manufactured by BASF SE), 10 g of polybutene ("POLYBUTENE 30N" manufactured by NOF CORPORATION), and 0.25 g of alicyclic dioxides ("CELLOXIDE" (registered trademark in Japan) 2021P manufactured by DAICEL CORPORATION, epoxy equivalent was 130) were dissolved in 400 g of toluene by the mixer, to thereby prepare an adhesive agent E.

Subsequently, in a manner similar to the example 1 except that the adhesive agent E was used in place of the adhesive agent A, the adhesive tape 1 was obtained.

Example 6

On a base 2 made of an aluminum sheet having a thickness of 50 μm, an undercoat solution, which was prepared by mixing 0.88 g of the antiblocking agent ("MX-80H3wT" manufactured by Soken Chemical & Engineering Co., Ltd.), 0.75 g of the 5% toluene diluted solution of tetraglycidyl meta-xylene diamine (manufactured by MITSUBISHI GAS CHEMICAL COMPANY, INC., epoxy equivalent was 90), 100 g of the acid modified polyolefin compound ("UNISTOLE P-902" manufactured by Mitsui Chemicals, Inc.), 224.5 g of toluene and 247 g of methyl ethyl ketone, was applied with the solids contents attaching amount of 0.4 g/m² to form an undercoat layer 3, and accordingly, a first lamination body, in which the base 2 and the undercoat layer 3 were laminated, was obtained.

Subsequently, the adhesive agent A was applied so that the thickness thereof after being dried was 40 μm, dried by heating for 3 minutes at 105° C., and thereby the adhesive tape 1 was obtained.

Example 7

70 g of the regular butyl rubber ("Exxon Butyl 268"), 27.5 g of the alicyclic saturated hydrocarbon resin ("ARKON" P125, manufactured by Arakawa Chemical Industries, Ltd., the softening temperature was 125° C.), 2.5 g of polybutene ("POLYBUTENE 30N" manufactured by NOF CORPORATION), and 5 g of the 5% toluene diluted solution of tetraglycidyl meta-xylene diamine (manufactured by MITSUBISHI GAS CHEMICAL COMPANY, INC., epoxy equivalent was 90) were dissolved in 400 g of toluene by the mixer, to thereby prepare an adhesive agent F.

Subsequently, in a manner similar to the example 1 except that the adhesive agent F was used in place of the adhesive agent A, the adhesive tape 1 was obtained.

Example 8

A corona treatment was applied to the base 2 made of the optical-use grade polyolefin film having the thickness of 40 μm (linear light transmittance in the wavelength of 340 nm was 90.5%), and an undercoat solution, which was prepared by mixing 0.75 g of the 5% toluene diluted solution of tetraglycidyl meta-xylene diamine (manufactured by MITSUBISHI GAS CHEMICAL COMPANY, INC., epoxy equivalent was 90), 100 g of the acid modified polyolefin compound ("UNISTOLE P-902", manufactured by Mitsui Chemicals, Inc.), 224.5 g of toluene and 247 g of methyl ethyl ketone, was applied with the solids contents attaching amount of 0.4 g/m² to form an undercoat layer 3, and accordingly, a first lamination body, in which the base 2 and the undercoat layer 3 were laminated, was obtained.

Subsequently, the adhesive agent A was applied onto a polyester film subjected to a release treatment so that the thickness thereof after being dried was 40 μm, dried by heating for 3 minutes at 105° C., and thereby a second lamination body, in which the adhesive agent layer 4 was laminated on the polyester film, was obtained.

Then, by bonding the first lamination body and the second lamination body so that the undercoat layer 3 and the adhesive agent layer 4 face each other, an adhesive tape 1, in which the base 2, the undercoat layer 3 and the adhesive agent layer 4 were laminated in the order, was obtained.

Comparative Example 1

95 g of the regular butyl rubber ("Exxon Butyl 065") and 5 g of the alicyclic saturated hydrocarbon resin ("ARKON" P85, manufactured by Arakawa Chemical Industries, Ltd., the softening temperature was 85° C.) were dissolved in 420 g of toluene by the mixer, to thereby prepare an adhesive agent G.

Subsequently, the adhesive agent G was applied onto a base made of an industrial-grade polyester film (linear light transmittance in the wavelength of 340 nm was 71.5%), whose surface was subjected to the corona treatment, so that the thickness thereof after being dried was 40 μm, dried by heating for 5 minutes at 100° C., and thereby an adhesive tape 1 was obtained.

Comparative Example 2

40 g of the regular butyl rubber ("Exxon Butyl 268"), 25 g of the alicyclic saturated hydrocarbon resin ("ARKON"

P125, manufactured by Arakawa Chemical Industries, Ltd., the softening temperature was 125° C.), 25 g of the polyisobutylene rubber ("Oppanol" B100, manufactured by BASF SE) and 10 g of polybutene ("POLYBUTENE 30N" manufactured by NOF CORPORATION) were dissolved in 400 g of toluene by the mixer, to thereby prepare an adhesive agent H.

Subsequently, in a manner similar to the example 1 except that the adhesive agent H was used in place of the adhesive agent A, the adhesive tape 1 was obtained.

Comparative Example 3

40 g of the regular butyl rubber ("Exxon Butyl 268"), 25 g of the alicyclic saturated hydrocarbon resin ("ARKON" P125, manufactured by Arakawa Chemical Industries, Ltd., the softening temperature was 125° C.), 25 g of the polyisobutylene rubber ("Oppanol" B100, manufactured by BASF SE), 10 g of polybutene ("POLYBUTENE 30N" manufactured by NOF CORPORATION), and 0.5 g of an alicyclic monoxide ("CELLOXIDE 2000" (product name), manufactured by DAICEL CORPORATION, epoxy equivalent was 124) were dissolved in 400 g of toluene by the mixer, to thereby prepare an adhesive agent I.

Subsequently, in a manner similar to the example 1 except that the adhesive agent I was used in place of the adhesive agent A, the adhesive tape 1 was obtained.

2. Evaluation Method
(1) Solubility Test

The adhesive tape 1, in which the weight (a) of the base 2 had been measured in advance, was cut into a dimension of 25 mm×35 mm, and the weight (b) thereof was measured. Subsequently, the adhesive tape 1 was soaked in each of the solvents of acetonitrile, dimethyl sulfoxide and methanol of 25 ml for 24 hours, dried at 120° C. for 2 hours, and was subjected to air-drying in a room to prevent the adhesive tape 1 from being attached by foreign matters, for 24 hours. Then, the weight (c) of the adhesive tape 1 after being dried was measured.

Based on the measured weights (a) to (c) of the adhesive tape 1, the solubility in each solvent was obtained by use of the following expression (1).

$$\text{Solubility (\%)}=(b-c)/(b-a)\times 100 \quad (1)$$

(2) Adhesive Force Test

In conformity with the method mentioned in JIS Z 0237, adhesive force (N/10 mm) of each of the adhesive tapes 1 prepared in the examples 1 to 8 and the comparative examples 1 to 3, with respect to a polypropylene (PP) plate, was measured. The measurement temperature was set to 23° C.

(3) Measurement of Transmittance

By use of the spectrophotometer (V-670DS, manufactured by JASCO Corporation), linear light transmittance of each of the adhesive tapes 1 prepared in the examples 1 to 8 and the comparative examples 1 to 3 in the range of wavelength from 200 nm to 800 nm was measured, and evaluation was carried out by the linear light transmittance at the wavelength of 340 nm.

(4) Adhesive Deposit Test

In each well of the microplate having 1536 wells (material: a cycloolefin copolymer (COC)), 5 µl to 10 µl of dimethyl sulfoxide (DMSO) was injected, and after each of the adhesive tapes 1 prepared in the examples 1 to 8 and the comparative examples 1 to 3 was attached, the microplate was exposed to vapor of DMSO at 40° C. for 72 hours.

Subsequently, the adhesive tape 1 was peeled off from the microplate at the peeling angle of 180° and the peeling speed of 20 m/min to 40 m/min, and whether there was adhesive deposit on the microplate was confirmed by a visual check.

Evaluation of the adhesive deposit test was carried out according to the following criteria.

A: No adhesive deposit was confirmed.
B: Adhesive deposit having an area of less than 5% of the area of the adhesive tape 1 was confirmed.
C: Adhesive deposit having an area of 5% or more to less than 10% of the area of the adhesive tape 1 was confirmed.
D: Adhesive deposit having an area of 10% or more of the area of the adhesive tape 1 was confirmed.

(5) Evaluation of Rewinding Performance 100 m of the base 2 (first lamination body) of each of the adhesive tapes 1 of the examples 1 to 8 and the comparative examples 1 to 3 was rewound under a constant tension, and presence or absence of wrinkling was observed. Note that, with respect to the examples 1 to 8 and the comparative examples 2 and 3, the first lamination body, in which the undercoat layer 3 was formed on the base 2, was rewound. Moreover, with respect to the comparative example 1, only the base 2 was rewound without forming the undercoat layer 3.

3. Evaluation Results

Evaluation results for the adhesive tapes 1 in the examples 1 to 8 and the comparative examples 1 to 3 are shown in Table 1.

TABLE 1

|  |  |  | Example 1 | Example 2 | Example 3 | Example 4 | Example 5 | Example 6 |
|---|---|---|---|---|---|---|---|---|
|  | Base |  | Optical-use polyolefin | Optical-use polyolefin | Optical-use polyolefin | Optical-use polyolefin | Optical-use polyolefin | Aluminum |
| Undercoat layer | | Type | Acid modified polyolefin | Acid modified polyolefin | Acid modified polyolefin | Acid modified polyolefin | Acid modified polyolefin | Acid modified polyolefin |
| | | Antiblocking agent | Contained | Contained | Contained | Contained | Contained | Contained |
| Adhesive agent layer | Type of adhesive agent | | A | B | C | D | E | A |
| | Rubber component (parts by weight) | Butyl rubber | 40 | 40 | 40 | 40 | 40 | 40 |
| | | Polyisobutylene | 25 | 25 | 25 | 25 | 25 | 25 |
| | | Alicyclic saturated hydrocarbon | 25 | 25 | 25 | 25 | 25 | 25 |

TABLE 1-continued

|  |  |  |  |  |  |  |  |
|---|---|---|---|---|---|---|---|
|  | resin (parts by weight) |  |  |  |  |  |  |
|  | Softener polybutene (parts by weight) | 10 | 10 | 10 | 10 | 10 | 10 |
|  | Epoxy compound (parts by weight) | 4-functional 0.25 | 4-functional 0.1 | 4-functional 1 | 4-functional 0.25 | 2-functional 0.25 | 4-functional 0.25 |
| Solubility | Dimethyl sulfoxide (%) | 1.3 | 1.2 | 1.4 | 1.5 | 1.4 | 1.8 |
|  | Acetonitrile (%) | 1.7 | 1.6 | 1.5 | 1.4 | 1.9 | 1.4 |
|  | Methanol (%) | 2.7 | 2.3 | 2.6 | 1.9 | 2.7 | 2.0 |
| Adhesive deposit test |  | A | B | A | A | B | A |
| Linear light transmittance (340 nm) (%) |  | 88.50 | 88.66 | 85.10 | 88.53 | 88.40 | 0.00 |
| Adhesive force to PP (N/10 mm) |  | 7.70 | 7.12 | 7.34 | 7.46 | 6.17 | 7.97 |
| Rewinding performance (presence or absence of wrinkling) |  | Absent | Absent | Absent | Absent | Absent | Absent |

|  |  | Example 7 | Example 8 | Comparative example 1 | Comparative example 2 | Comparative example 3 |
|---|---|---|---|---|---|---|
| Base |  | Optical-use polyolefin | Optical-use polyolefin | Industrial-use polyester | Optical-use polyolefin | Optical-use polyolefin |
| Undercoat layer | Type | Acid modified polyolefin | Acid modified polyolefin | None | Acid modified polyolefin | Acid modified polyolefin |
|  | Anti-blocking agent | Contained | Not contained | None | Contained | Contained |
| Adhesive agent layer | Type of adhesive agent | F | A | G | H | I |
|  | Rubber component (parts by weight) Butyl rubber | 70 | 40 | 95 | 40 | 40 |
|  | Polyisobutylene | 0 | 25 | 0 | 25 | 25 |
|  | Alicyclic saturated hydrocarbon resin (parts by weight) | 27.5 | 25 | 5 | 25 | 25 |
|  | Softener polybutene (parts by weight) | 2.5 | 10 | 0 | 10 | 10 |
|  | Epoxy compound (parts by weight) | 4-functional 0.25 | 4-functional 0.25 | Not contained 0 | Not contained 0 | Monofunctional 0.25 |
| Solubility | Dimethyl sulfoxide (%) | 1.5 | 1.3 | 1.4 | 1.2 | 1.5 |
|  | Acetonitrile (%) | 1.6 | 1.7 | 1.8 | 1.6 | 1.9 |
|  | Methanol (%) | 2.3 | 2.7 | 2.1 | 2.2 | 2.9 |
| Adhesive deposit test |  | C | A | D | D | D |
| Linear light transmittance (340 nm) (%) |  | 88.07 | 88.50 | 70.12 | 88.79 | 88.37 |
| Adhesive force to PP (N/10 mm) |  | 10.01 | 7.70 | 3.14 | 7.40 | 7.27 |
| Rewinding performance (presence or absence of wrinkling) |  | Absent | Slightly present | Absent | Absent | Absent |

As shown in Table 1, in the adhesive tapes 1 of the examples 1 to 8, it was confirmed that all of the solubility in solvents, the adhesive deposit on the microplate and the adhesive force to polypropylene were within preferable ranges.

Moreover, it was confirmed, in comparison between the examples 1 and 7, the adhesive tape 1 of the example 1 in which the adhesive agent layer 4 contained polyisobutylene was highly evaluated in the adhesive deposit test than the adhesive tape 1 of the example 7 in which the adhesive agent layer 4 did not contain polyisobutylene.

Further, in the adhesive tapes 1 of the examples 1 to 5, 7 and 8, it was confirmed that the linear light transmittance at the wavelength of 340 nm was 85% or more, and thereby the adhesive tapes 1 were suitable for use in the optical analysis using ultraviolet light.

From above, it was confirmed that the adhesive tape 1, in which the undercoat layer 3 contained the acid modified compound (acid modified polyolefin) and the adhesive agent layer 4 contained the butyl rubber, the alicyclic saturated hydrocarbon resin and the multifunctional epoxy-based compound, was suitable for the purpose of closing the wells in the microplate.

Further, it was confirmed that the adhesive tape 1, in which the undercoat layer 3 contained the acid modified compound (acid modified polyolefin), the adhesive agent layer 4 contained the butyl rubber, the alicyclic saturated hydrocarbon resin and the multifunctional epoxy-based compound, and optical-use polyolefin was used as the base 2, was suitable for the purpose of closing the wells in the microplate, and in addition, suitable for optical analysis.

In contrast thereto, in the comparative examples 1 and 2, in which the adhesive agent layer 4 did not contain an epoxy compound, and in the comparative example 3, in which the adhesive agent layer 4 contained a monofunctional epoxy-based compound instead of the multifunctional epoxy-based compound, it was confirmed that the adhesive deposit was likely to occur when the adhesive tape 1 was removed from the microplate.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiments was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An adhesive tape for a microplate comprising:
    a sheet-shaped base;
    an undercoat layer that is laminated on the base and contains an acid modified polyolefin compound obtained by applying graft polymerization of unsaturated carboxylic acid and/or acid anhydride thereof to polyolefin; and
    an adhesive agent layer that is laminated on the undercoat layer and contains an adhesive agent comprising butyl rubber, an alicyclic saturated hydrocarbon resin whose softening temperature is in a range from 85° C. or more to 140° C. or less and a multifunctional epoxy-based compound including glycidyl groups and having two to four epoxy groups, wherein
    the adhesive agent layer contains the multifunctional epoxy-based compound in the range from 0.1 parts by weight to 1 part by weight with respect to 100 parts by weight of the adhesive agent except for the multifunctional epoxy-based compound, and
    the adhesive agent layer has solubility of 3% or less in each of acetonitrile, dimethyl sulfoxide and methanol.

2. The adhesive tape for a microplate according to claim 1, wherein
    the base is composed of a polyolefin-based polymer.

3. The adhesive tape for a microplate according to claim 1, wherein
    the adhesive agent layer further contains polyisobutylene.

4. The adhesive tape for a microplate according to claim 1, wherein
    linear light transmittance of the adhesive tape is 85% or more to any light in a range of wavelength from 340 nm or more to 800 nm or less.

5. The adhesive tape for a microplate according to claim 1, wherein
    the adhesive agent layer has an adhesive force of in a range from 3N/10 mm or more to 10N/10 mm or less with respect to each of polypropylene, polystyrene, polycarbonate, a cycloolefin polymer and a cycloolefin copolymer under a temperature from 0° C. to 40° C.

* * * * *